US 6,332,427 B1

(12) United States Patent
Coulson

(10) Patent No.: US 6,332,427 B1
(45) Date of Patent: Dec. 25, 2001

(54) SELF SUPPORTING HANGING BIRD FEEDER

(76) Inventor: Bob G. Coulson, P.O. Box 3775, Bernice, OK (US) 74331

( * ) Notice: Subject to any disclaimer, the term of this patent is extended or adjusted under 35 U.S.C. 154(b) by 0 days.

(21) Appl. No.: 09/298,606

(22) Filed: Apr. 26, 1999

(51) Int. Cl.$^7$ .................................................. A01K 61/02
(52) U.S. Cl. .................... 119/57.8; 119/51.01; D30/124; D30/133
(58) Field of Search ................ 119/57.8, 51.01, 119/51.03, 52.2, 52.4; D30/124, 127, 128, 133, 121

(56) References Cited

U.S. PATENT DOCUMENTS

| D. 251,021 | * | 2/1979 | Blasbalg | D30/153 |
| D. 407,173 | * | 3/1999 | Marshall | D30/124 |
| D. 421,159 | * | 2/2000 | Kreusser | D30/124 |
| 1,891,042 | * | 12/1932 | Benoit | 119/57.8 |
| 2,306,312 | * | 12/1942 | Hyde | 119/57.8 |
| 2,944,516 | * | 7/1960 | Malloy, Sr. | 119/57.8 |
| 3,083,687 | * | 4/1963 | Slaven | 119/57.8 |
| 3,977,363 | * | 8/1976 | Fisher, Jr. | 119/57.8 |
| 4,917,050 | * | 4/1990 | Clarke | 119/52.3 |
| 5,195,463 | * | 3/1993 | Lorenzana | 119/57.8 |
| 5,435,268 | * | 7/1995 | Liethan | 119/57.8 |
| 5,671,696 | * | 9/1997 | Liethen | 119/57.8 |
| 5,722,344 | * | 3/1998 | Rank | 119/57.8 |
| 6,213,054 | * | 4/2001 | Marshall | 119/57.8 |

* cited by examiner

Primary Examiner—Charles T. Jordan
Assistant Examiner—Judith A. Nelson
(74) Attorney, Agent, or Firm—Head, Johnson & Kachig

(57) ABSTRACT

A feeder for small birds having an elongated tube with a plurality of spaced apart perch support openings drilled therethrough and spaced above each perch support opening is a feed dispensing opening, a perch rod received within each of the perch support openings, a top cap removably receivable on the tube top end and having a central opening therethrough, a bottom cap removably received on the tube bottom end and having an opening therethrough and a flexible line received through the tube and through the opening in the top cap whereby the top cap can be slidably moved on the line and the line extending through the opening in the bottom cap by which the line is secured to said bottom cap, the line having an upper portion above the top cap by which the line may be secured to a support structure and by which the tube is vertically supported, the top and bottom caps being removable for filling or emptying the tube of bird feed without removing the line.

5 Claims, 1 Drawing Sheet

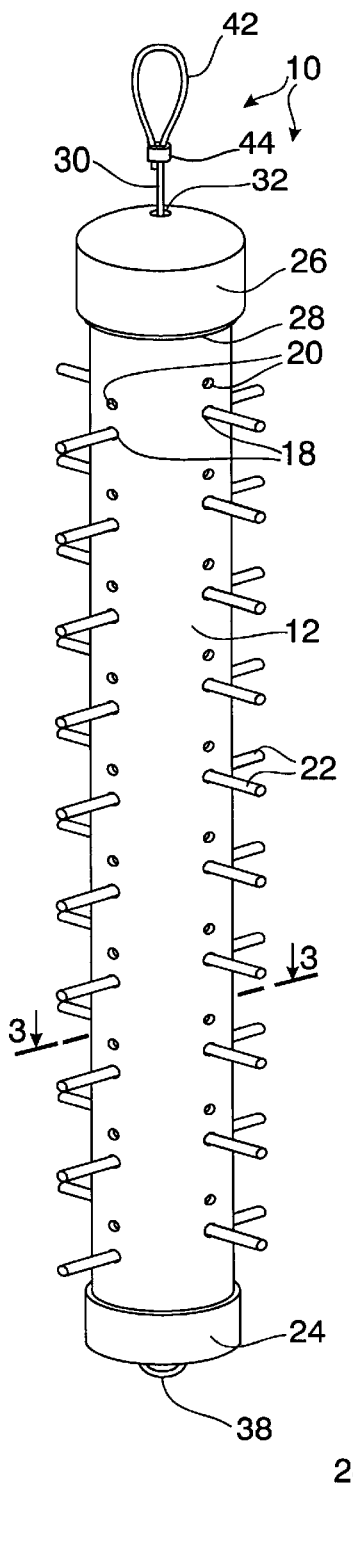
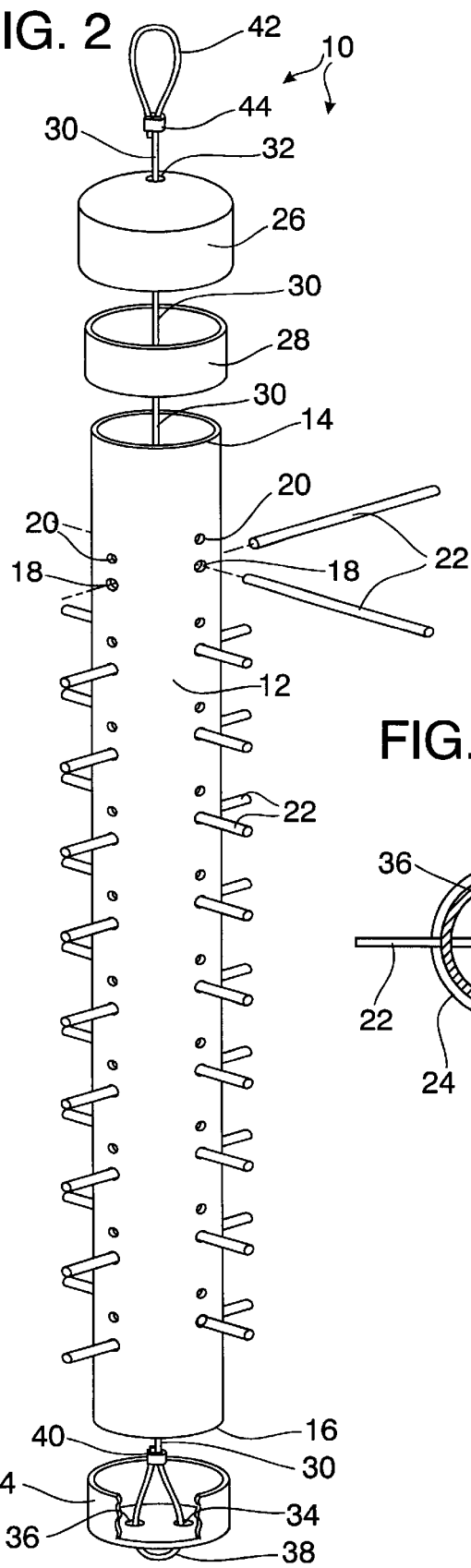
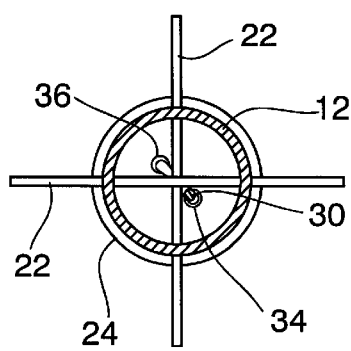

SELF SUPPORTING HANGING BIRD FEEDER

REFERENCE TO PENDING APPLICATIONS

This application is not related to any pending United States or international patent application.

CROSS-REFERENCE TO FEDERALLY SPONSORED RESEARCH OR DEVELOPMENT

This application is not related to any federally sponsored research or development projects.

REFERENCE TO MICROFICHE APPENDIX

This application is not referenced in any Microfiche Appendix.

BACKGROUND OF THE INVENTION

1. Field of the Invention

The invention herein relates to a feeder for feeding small birds and particularly a feeder having multiple perches for simultaneously feeding small seeds to a plurality of small birds.

2. Description of Related Art

The invention herein is of a type that, in other embodiments, has been used for feeding small birds. The feeder herein is particularly applied to feeding finches and birds similar to the finch species and the feeder is most particularly applied to feeding small diameter seeds such as thistle seed, a type of natural food to which finches and similar birds are attracted.

Others have provided vertical tubular feeders having a plurality of perches with a seed dispensing hole above each perch and in which the tubular feeder has a cap that can be removed for filling an upper open end of the tubular bird feeder. The typical tubular multiple perch bird feeder in present use requires that the top cap be secured to the tubular body by which the tubular body and the seeds contained therein is supported, a support rope or wire being attached to the removable top cap. A problem with existing bird feeders of this type is that seeds are refilled from the top. This means that the older seeds remain in the lower portion of the feeder. When the feeder is subjected to rain and/or snow, water can enter the feeder to cause deterioration of the seeds in the feeder. The deteriorated seeds tend to remain in the bottom portion of the feeder and wet seeds can develop bacteria that can be harmful to birds.

The present invention overcomes the problem with existing tubular multiple perch feeders for small birds by providing a feeder that can easily be filled from the bottom so that the remaining seeds in the feeder are always in the upper portion of the feeder and therefore seeds do not tend to remain for long periods of time within the feeder. The seeds are consumed from the top down meaning that the older seeds are first consumed, thus eliminating the problem of old, wet, molded or deteriorated and possibly bacteria-infested seeds remaining in the feeder.

For background information to bird feeders, the general type to which this invention pertains, reference can be had to the following previously issued United States Patents:

| PATENT NO. | INVENTOR | TITLE |
| --- | --- | --- |
| 1,891,042 | Benoit | Chicken Feeder |
| 2,306,312 | Hyde | Bird Feeding Device |
| 2,944,516 | Malloy, Sr. | Bird Feeder |
| 3,083,687 | Slaven | Bird Feeder |
| 3,977,363 | Fisher, Jr. | Bird Feeder |
| 4,917,050 | Clarke | Birdfeeder |
| 5,195,463 | Lorenzana et al. | Bird Baths and Combination Hanging and Pedestal Mountings Therefor |

BRIEF SUMMARY OF THE INVENTION

The invention herein is a feeder for small birds. The feeder includes an elongated tube, preferably a plastic, and preferably having a relatively thin wall that can be transparent or opaque so as to visually disclose the level of seeds remaining in the feeder. The elongated tubular body of the feeder has an open top end, an open bottom end and a tubular sidewall. The sidewall has a plurality of spaced-apart perch support openings drilled therethrough perpendicular to an axis of the tube. The tube also has a small feed dispensing opening spaced above each of the perch support openings.

Perch rods are received within the perch support openings. Each perch rod extends perpendicularly through the tube and exteriorly of opposed sides of the tubular sidewall. In a preferred arrangement the perch support openings are drilled radially through the tube and are oriented so that adjacent perch supports are out of angular alignment with each other.

A top cap is removably received on the tube top end, the top cap having a central opening therethrough. A bottom cap is removably received on the tube bottom end. The bottom cap has at least one opening through it.

A flexible line is received through the tube to extend out both ends of the tube. A bottom portion of the flexible line is secured to the bottom cap by extending through the opening in the bottom cap. In a preferred embodiment the bottom cap has two openings so that the line can be looped through the two openings and secured to itself to thereby attach the bottom cap to a bottom end of the line. The line extends upwardly through the tube and an upper end portion of the line extends through the opening in the top cap. The top cap therefore is slidably received on the line and the upper portion of the line is attached to a support structure.

In use, the tubular body is filled with seeds and vertically supported to extend downwardly from a support structure. When additional seeds are required, the user can turn the tube upside down while maintaining the top cap in position to keep seeds within the tube from spilling out. The user can then pull sufficient line through the tube so as to permit the bottom cap to be removed. Additional seeds can then be poured into the bottom end of the tube. Thereafter, the bottom cap is replaced on the tube and the tube again returned to its normal vertical position, the excess line being pulled through the tube so that the weight of the tube and seeds therein is supported by the bottom cap.

A more complete understanding of the invention will be obtained from the following detailed description, taken in conjunction with the attached drawings.

BRIEF DESCRIPTION OF SEVERAL VIEWS OF THE DRAWINGS

FIG. 1 is an elevational view of an assembled feeder for small birds that incorporates the principles of this invention.

FIG. 2 is an elevational exploded view of the feeder of FIG. 1 showing the top cap and bottom cap removed from the tubular feeder body.

FIG. 3 is a cross-sectional view taken along the line 3—3 of FIG. 1.

DETAILED DESCRIPTION OF A PREFERRED EMBODIMENT

Referring to the drawings, the feeder for small birds is generally indicated by the numeral 10. The feeder, as illustrated in the drawings includes an elongated tubular body 12 that is preferably made of plastic and preferably of transparent or translucent plastic. When body 12 is of translucent plastic it may be of various colors but it preferably has sufficient transparency that the elevation of seed level within in the feeder is readily discernable. Tubular body 12 has an upper end 14 and a lower end 16.

Formed in tubular body are a plurality of spaced apart perch support openings 18. Perch support openings 18 are drilled radially through the tubular axis of tubular body 12 so that aligned openings are formed in opposite sides of the tubular body. Perch support openings 18 are spaced apart from each other at a distance that allows room for birds on perches between the spaced openings.

The length of tubular body 12 can vary considerably and may, as an example, be from about 24 inches to about 96 inches. The number of perch supports and therefore the number of perch support openings 18 will depend primarily upon the length of the tubular body. The tubular body is, as stated above, preferably formed of plastic and can ideally be formed of extruded polycarbonate with a wall thickness of about 0.02 inches. While polycarbonate is an ideal material for making the tubular body, obviously other kinds of plastics can be employed.

The outside diameter of tubular body 12 can vary and may, as an example, be about 1⅝ inches, although larger or smaller diameters can be employed.

Spaced above each perch support opening 18 is a feed dispensing opening 20. The size of feed dispensing openings 20 is determined primarily upon the type of feed to be dispensed and the type of birds the feeder is designed to attract.

A perch rod 22 is inserted in each pair of perch support openings 18. The perch rods may be of metal or plastic however, plastic is preferred and an ideal plastic is molded or cast acrylic. The diameter of the perch rods may be about ¼th inch. The perch rods are cut to a length to extend beyond the outside circumferential surface of the tubular body 12 in opposed directions. When the tubular body is about 1⅝ inches in diameter, perch rods 22 may, as an example, be about 6 inches in length so that thereby the rods extend about 2½ inches beyond opposed sides of the exterior wall of tubular body 12. Closing the lower end 16 of tubular body 12 is a bottom cap 24 that has a closed bottom end and tubular side walls. Bottom cap 24 is preferably formed of plastic and has a tubular side wall having an internal diameter so that it is slidably and snugly received on the exterior bottom of tubular body 12.

A top cap 26 is preferably formed of plastic and has a closed end with a tubular side wall, the tubular side wall being such as to snugly but slidably receive the upper end of tubular body 12. In the illustrated and in a preferred embodiment of the invention top cap 26 is dimensioned to receive a tubular hard cap 28. Hard cap 28 is dimensioned to have an internal diameter to slidably fit over the external upper surface of tubular body 12 and hard cap 28 has an external diameter to be slidably positioned within top cap 26. Preferably, hard cap 28 is dimensioned to be permanently retained within top cap 26 and for this purpose it may be secured by adhesive or it may be constructed so as it dimensionally fits within top cap 26 so that no adhesive or bonding material is required. Hard cap 28 adds structural rigidity to top cap 26 and is helpful in making the top cap more secure against the entrance of moisture, however the use of hard cap 28 is optional.

A line 30 extends through a central opening 32 in top cap 26, through tubular body 12 and is secured at its lower end to bottom cap 24. In order to effectively secure line 30 to bottom cap 24 the bottom cap 24 is preferably provided with two spaced apart openings 34 and 36. Line 32 extends through opening 36 to form a loop 38 and back through opening 26. The loop is closed by a clamp 40 that may be in the form of a small diameter metal clamp such as made of aluminum or the like that is press-fitted over line 30 and the loop portion to permanently provide loop 38 to thereby permanently secure bottom cap 24 to the lower end of line 30. Top cap 26 is slidable on line 30 however, the opening 32 in the top cap is preferably only that which is large enough to slidably receive the line but to fit snugly with the line so as to reduce the possibility of water, such as from rain or snow, entering into the interior of tubular body.

Formed at the upper end of line 30 is a top loop 42 secured by a top clamp 44 that is like bottom clamp 40—that is, it is preferably a short tubular element formed of metal that is easily deformable so that when crimped it will permanently maintain loop 42 at the upper end of line 30. It can be seen that bottom clamp 40 and top clamp 44 can be eliminated and line 30 could be tied to secure the lower loop 38 and upper loop 42, however, a preferred material for forming line 30 is the commonly available cord utilized on grass cutting tools that is formed of tough plastic which is difficult to tie into a knot but is long lasting, readily available, and inexpensive and therefore the preferred way of manufacturing the feeder for small birds of this invention is by the use of clamps 40 and 44.

The assemble feeder as shown in FIG. 1 is suspended from a support element from top loop 42. Where the feeder is used under a tree a support line may be extended down from a limb of the tree to attach to top loop 42. The support line may be arranged so that the feeder can be raised and lowered as required to simplify adding seeds to the feeder.

In using the feeder for small birds, the user turns the feeder upside down—that is, so that the top cap 26 is at a lower elevation than the bottom cap 24. This causes seed remaining in the feeder to move downwardly against top cap 26. The user then removes bottom cap 24 to expose the open end 16 of tubular body 12 and fills the tubular body with seed. Bottom cap 24 is then replaced onto tubular body 12 and the feeder is then ready to be rehung—that is, vertically supported as illustrated in FIG. 1. In this manner, fresh seed is always at the bottom of the feeder which means that seed in the bottom end of the tubular body 12 below the lowest feed dispensing opening 20 does not constantly remain in the feeder as is the case when feeders are designed and used in which fresh seed is added from the top. By constantly adding fresh seed from the bottom the possibility of bacteria developing in wet seed is substantially eliminated. This feature is important in reducing creation and spread of bacteria that can be harmful to birds.

As shown in FIG. 3, the line 30 extends through the full length of tubular body 12 does not interfere with perch rods 22.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A feeder for small birds, comprising:

an elongated tube having a top end, a bottom end and a tubular sidewall, the sidewall having a plurality of spaced apart perch support openings drilled therethrough perpendicular to a tubular axis of the tube and spaced above each of said perch support openings, a feed dispensing opening;

a perch rod received within each of said perch support openings, each perch rod extending exteriorly of and on opposite sides of said tube to provide perches on which small birds may alight;

a top cap removably receivable on said tube top end and having a central opening therethrough;

a bottom cap removably received on said tube bottom end and having at least one opening therethrough; and a flexible line having a first end and a second end, the line being received through said tube and through said opening in said top cap whereby said top cap can be slidably moved on the line and the line extending through said at least one opening in said bottom cap by which the line is secured to said bottom cap, the line having an upper portion adjacent said first end spaced from said top cap by which said line may be secured to a support structure and by which said tube is vertically supported, said top and bottom caps being removable for filling or emptying said tube of bird feed without removing said line.

2. A feeder for small birds according to claim 1 wherein said elongated tube is made of translucent or transparent plastic.

3. A feeder for small birds according to claim 1 wherein said line is a plastic line.

4. A feeder for small birds according to claim 1 wherein said perch rods are cylindrical plastic rods.

5. A feeder for small birds according to claim 1 wherein said tube is made of polycarbonate and is of about 5/8 inch to about 1 inch in outside diameter.

* * * * *